Sept. 23, 1958     G. E. GROENER     2,852,849
PNEUMATIC GAUGING DEVICE
Filed Dec. 17, 1954
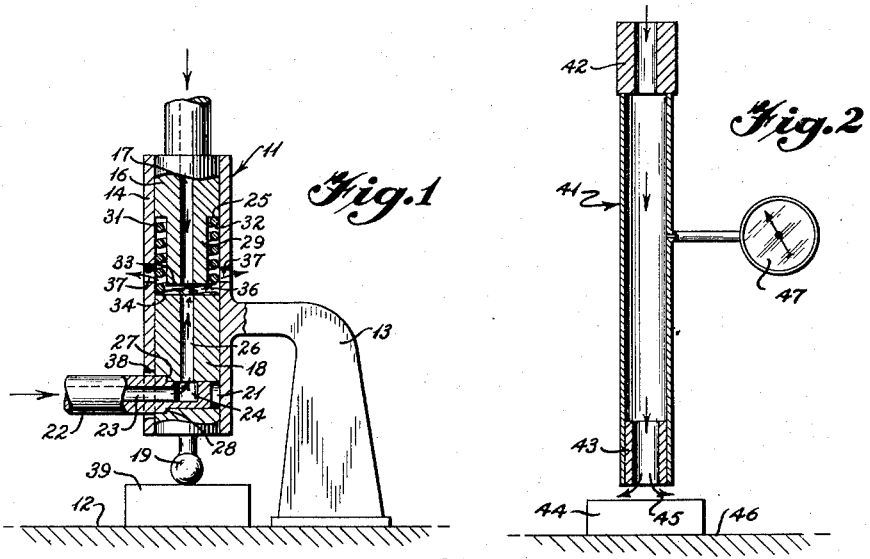
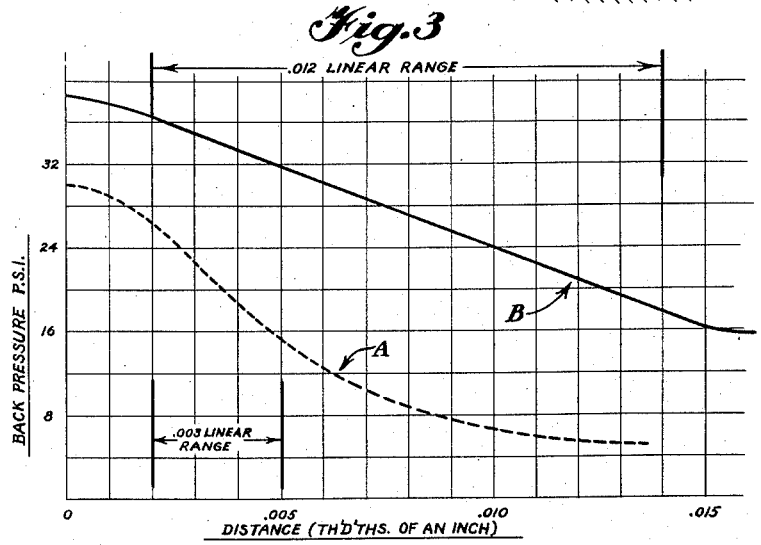
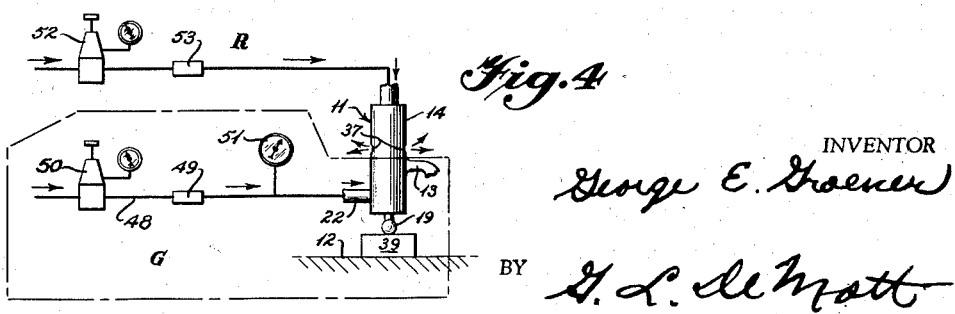
INVENTOR
George E. Groener
BY G. L. DeMott
ATTORNEY United States Patent Office 2,852,849
Patented Sept. 23, 1958

2,852,849

PNEUMATIC GAUGING DEVICE

George E. Groener, Detroit, Mich., assignor to General Motors Corporation, Detroit, Mich., a corporation of Delaware Application December 17, 1954, Serial No. 475,983

10 Claims. (Cl. 33—172)

The present invention relates to a pneumatic measuring gauge which utilizes a differential pressure effect between a pair of opposed air streams to compare a dimensional variation of an object under test with that of a standard object.

Pneumatic measuring gauges, per se, have long been used. One type of pneumatic gauge utilizes back pressure changes in an air supply line occasioned by flow through a variable-size orifice to indicate a relative size variation in an object under test from that of a standard object. It is this type of gauge with which the present invention is primarily concerned. In the back pressure type of gauge the critical dimension of the object under test directly or indirectly determines the size of the orifice or orifice opening through which a stream of air may escape. In an open-jet type gauge, if the test object is too small, the orifice opening may be relatively large with a consequent rapid escape of air and accompanying decrease in the build-up of back pressure in the gauging circuit when compared to a standard test piece. Likewise, if the test piece be oversized, the orifice opening may be relatively small with a consequent build-up in back pressure. With such gauges the dimensional variation from a norm is usually measured directly in fractions of an inch rather than in terms of pressure.

It is known that with air escaping through a variable-size orifice, the rate of back pressure drop to each equal increment of orifice opening is substantially linear; i. e., an equal pressure drop occurs for equal increments of orifice opening, for a relatively small part of the range from a closed to a fully opened orifice. Since an air jet is accurate for measurement purposes only within this linear range, it is obvious that this range limits the utility of the gauge.

In comparing back pressure drop with the distance of the workpiece from a gauging jet opening, using a single or unopposed jet air stream, there is found to be a relatively small linear range within which there is an equal drop or rise in back pressure for an equal increment of orifice opening. Within this range, which with a previously commonly used gauge was in the nature of .003 of an inch, the gauge will accurately measure dimensional variations. It is apparent, however, that where dimensional tolerances are, for example, in excess of .003 of an inch, such gauge will not give an accurate reading.

It was discovered that by decreasing the rate of air escape from a gauging jet by means of an opposed air stream the linear measuring range of such a gauge could be increased. This discovery has resulted in a pneumatic air gauge of greatly increased utility.

Accordingly, it is the purpose of the present invention to utilize opposed jet air streams to provide a pneumatic gauge having greater ranges of measuring and sensitivity than has heretofore been possible.

With previously known types of pneumatic gauges, variations in the linear measuring range as well as in the degree of sensitivity could be achieved, but these only by physical changes in the components of the gauge. In other words, by changing the size or number of the various jet nozzles differing types of gauge performance could be achieved. In the present invention, however, a greater degree of gauge versatility is achieved without physically changing or interchanging any of the gauge components.

The preferred embodiment of the invention is shown in the drawings and is described in detail hereinafter.

In the drawings:

Figure 1 is a sectional view of a preferred embodiment of the subject pneumatic gauge.

Figure 2 represents a conventional open-jet type of pneumatic gauge.

Figure 3 is a graphic comparison of the linear measuring ranges of the gauges shown in Figures 1 and 2.

Figure 4 discloses a control system embodying the preferred form of the invention.

Referring to Figure 1, a gauge is shown generally at 11 and is supported on a base member 12 in any convenient way. In this case, the gauge is shown mounted on or integrally formed with a bracket 13 which may be adjustably connected to the base 12. It is apparent that the gauge may be portable or stationary depending on how it is to be used.

Gauge 11 includes a ported casing 14 having rigidly fixed in one end thereof a jet or plug 16 which includes an axial passage 17. Slidably disposed in the other end of the casing is a measuring jet or plug 18 having formed at one end thereof a follower 19 adapted to projected exteriorly of the casing. The slidable plug 18 has a diametrical bore 21 therethrough which is adapted to receive an air supply pipe 22 having conduits 23 and 24 formed therein. A longitudinal passage 26 in the slidable plug is adapted to communicate with conduit 24 in pipe 22. Bore 21 is counterbored to provide a shoulder 27 against which a corresponding shoulder 28 on the pipe 22 is adapted to abut to facilitate the alignment of conduits 24 and 26.

The air supply pipe 22 may either be flexible itself or merely have a flexible portion so as not to inhibit the sliding movement of the plug.

The fixed plug 16 is peripherally relieved to provided a seat 25 and a supporting stem 29 for a spring member 31. The other end of spring 31 biases against the slidable plug and tends to move the latter axially away from the fixed plug.

The fixed and slidable plugs 16 and 18 together with casing 14 define a variable-size chamber 32. More particularly, the adjacent plug faces 33 and 34 define an orifice or passage 36, the size of which is variable in accordance with the axial position of the movable plug. It is this variable size orifice 36 which generally determines the back pressure build-up in the gauging pressure supply line and accordingly is the means by which variations in the size of an object under test are measured.

The flattened plug ends 33 and 34 cooperate in this embodiment to define a flat transverse orifice 36 which is peripherally unobstructed. It is the principle of using an orifice generally rather than the particular type of orifice, however, that is basic in this device. It is apparent that the gauge would also function suitably if the orifice merely included a radial or diametrical passage the size of which is similarly variable.

Due to ease and economy of manufacture it is preferred that fixed plug 16 be inserted within the casing 14 and thereafter secured against movement. It is obvious, however, that plug 16 could be integrally formed with the casing if it is so desired.

A plurality of ports 37 are formed in the casing 14 and vent chamber 32 to the atmosphere at all times.

Casing 14 is suitably longitudinally relieved at 38 to prevent any interference by pipe 22 with the axial movement of the slidable plug.

A gauging air stream, from a system described below, is supplied to pipe 22 and passes through conduits 23, 24 and 26 to orifice 36 and thence to the atmosphere through ports 37. Within the limits basically determined by the gauging air pressure level, the rate at which air will escape to the atmosphere is determined by the size or volumetric capacity of orifice 36. In other words, when the slidable plug is at its maximum axial displacement from the fixed plug, the air will escape to the atmosphere at a maximum rate and accordingly a minimum pressure build-up will occur in the system. As the slidable plug 18 axially approaches the fixed plug 16, the size of the passage or orifice 36 is reduced. This results in a decreasing rate of air escape and a consequent back pressure build-up in the gauge jet line. As will be discussed below, these pressure changes may be observed through the use of a suitable measuring device in the gauging air jet supply line.

It is necessary that the cumulative size or cross sectional area of ports 37 be greater than that of the greatest opening of orifice 36. In this way the back pressure level in line 22 is always controlled by the orifice opening throughout the travel of plug 18. To illustrate the converse of this effect, assume that ports 37 were of a size to permit the escape of air at the rate of five cubic feet per second, and that orifice 36 when three-fourths open would permit air to escape at this same rate. This would mean that further opening movement of the sliding or measuring plug would increase the orifice opening, but this would occasion no further reduction in back pressure, since the size of the exhaust ports would thereafter control the rate of escapement of air from the gauge. Thus, the last one-quarter of the plug travel would fail to indicate any dimensional variation.

With the gauge as thus far described, it has been found that the linear measuring range is fixed and frequently relatively small. To increase this measuring range, it was discovered that by providing a reference air stream, which opposes the gauging air stream, the rate of escape of gauging air to the atmosphere may be reduced and, accordingly, the linear measuring range greatly increased.

It is at this juncture that the subject invention departs from what has previously been accomplished in pneumatic gauges of this type to add a new concept which greatly enhances the utility of these gauges.

Accordingly, a reference air stream is supplied to conduit 17 in the fixed plug 16. The reference and gauging air streams thus meet in opposed relation at the orifice 36.

While the physical relationship of the gauging and reference air streams to the gauge components is susceptible to a range of choices, as will be suggested below, it is fundamental that with respect to each other the air streams be in opposed relation.

Depending on the general pressure level of the reference jet, the rate of escape of gauging air may be closely controlled. It becomes immediately obvious one of the advantages in providing such a reference air jet stream is that various pressure levels may be selected, and in this way alone, that is without physically modifying the gauge, the sensitivity of the gauge and the measuring range may be adjusted to varying needs.

As seen in Figure 1, a test specimen 39 is mounted on the supporting structure 12 beneath the gauge so that the follower member 19 contacts the surface of the specimen. With the specimen in position, the size of orifice 36 is fixed, and a fixed pressure build-up occurs in the gauge jet line. Thereafter any variations in thickness from that of a normal specimen may be noted directly on a suitably provided gauge.

In order to compare the operation and thus the advantages of the present invention with a type of pneumatic back pressure gauge used heretofore, a conventional open-jet gauge 41 is shown in Figure 2. This gauge includes a restrictor 42 and a jet 43. The pressure in the system between the restrictor and the jet is determined by the nearness of the part being gauged to the open end of the jet. This is true because the restrictor is necessarily made with a smaller hole than is the jet. The restrictor, therefore, cannot supply air to the system as fast as it escapes out of the jet if the workpiece is any large distance from the jet opening. In this case a specimen 44 is mounted on a supporting member 46 in such a way that the space 45 between the jet and the test surface constitutes an orifice or restriction through which air can escape and which is variable in accordance with any variations in the thickness of the test specimen. As already noted, any variation in the size of the space between the jet and the specimen will cause changes in the back pressure build-up to be registered on a gauge 47 disposed in the back pressure chamber defined by the restrictor and the jet. In this case the regulated air enters the restrictor, passes through the gauge, and out of the jet at a rate commensurate with the capacity of opening 45.

Figure 3 illustrates the pronounced difference in the measuring capacity or range of the more or less conventional open-jet type of gauge of Figure 2, as contrasted with the opposed jet gauge which is the subject of the present invention.

Referring to curve A, in plotting back pressure as the ordinate and the distance of the workpiece from the air jet head as the abscissa, a curve is obtained which changes from concave downward to concave upward. At the point of transition the slope of the curve reaches a maximum and approaches a straight line. The vertical projection on the horizontal or distance axis of this straight section of the curve is called the linear range, since for each change in distance, in inches, of the workpiece from the air jet head there is an equal change in back pressure, in pounds per square inch. It is this characteristic that permits the precise marking of an air gauge dial in equal increments within the end points of the linear range. In regard to curve A, the linear range is in the nature of .003 of an inch which thus determines the tolerance range within which such a gauge can accurately function.

The success of the subject device in flattening the back pressure curve and consequently extending the linear range of this type gauge is apparent in curve B. In curve B it will be seen that through the use of an opposed jet, the linear range will be extended from .003 to .012 of an inch or fourfold. A simple adjustment of pressure level, either gauging or reference, thus enables the opposed jet gauge to be instantly adapted for use in testing objects having greatly varying tolerance requirements. It is to be understood that these comparisons are intended to be illustrative of the relative results obtainable.

This opposed type jet gauge is unique in that the regulated supply pressure to either jet can be changed to obtain differing degrees of gauge sensitivity and linear range. It will be understood from the explanation below that sensitivity and linear range are inversely related; that is, as the sensitivity of the gauge increases, the linear range must necessarily decrease and vice versa. The reference jet air stream exercises control over the rate of escapement of air from the gauging jet, and it is now apparent from the illustrated graphs that when the rate of air escaping from the gauging jet is slow, a relatively long linear range is obtained. This, of course, requires a relatively high reference jet pressure as compared with that of the gauging jet pressure.

By changing either or both the pressure level of the reference and/or gauging air streams, various pressure-distance curves can be interpolated between the curves A and B. In this manner the gauge sensitivity may be varied to accommodate varying tolerance requirements. To illustrate, if it is desired to have the gauge very sensitive over a small linear range to small dimensional changes in the pieces being tested, the pressure differential between the opposed jets will be increased. The pressure differential in such case would mean a relative increase in the gauging over the reference pressure. In other words, a curve representing this pressure-distance relationship would be closer to curve A than to curve B.

This increased pressure differential could be achieved most economically by reducing the reference jet pressure. The same result could be obtained, however, by increasing the gauging jet pressure or by a combination of raising the gauging and lowering the reference pressures.

A complete measuring circuit within which the preferred embodiment of the subject gauge could be utilized is illustrated in Figure 4. The circuit is conveniently divided into a gauging circuit G and a reference circuit R. The pneumatic pressure in the circuits may be supplied by a common source of pressure or separate sources of pressure, whichever is the more convenient. The gauging circuit G includes, downstream of the pressure source not shown, a pressure regulator 50 which feeds a basic pressure through a conduit 48. Next a small orifice restrictor 49 is provided in line 48 along with a measuring gauge 51. The restrictor 49, the gauging jet 18, and gauge 51 are related in the same way as the corresponding elements described with reference to Figure 2 and again constitute a back pressure chamber. Gauge 51 will indicate variations in back pressure due to variations in the rate of escape of air from the gauge orifice 36 in accordance with the degree of dimensional non-conformance of the piece under test.

The reference circuit R, likewise, includes a pressure regulator 52 and a small orifice restrictor 53 which determine the basic reference pressure. It is apparent in both of these circuits that by regulating the pressure of the pressure regulators 50 and 52 the pressure levels of the gauge and reference air streams may be adjusted as already suggested.

The gauge and reference circuits as disclosed in Figure 4 have been successfully operated, but it is understood that many variations therein may be made without departing from the teaching of this invention.

The physical variations in the type of gauges which could utilize the opposed air jet principle as set forth are manifold, and it has been the purpose of this disclosure thus far to illustrate one successful embodiment of the gauge. It is apparent, as is frequently the case, that the scope of this teaching transcends the particular embodiment set forth.

While the following is not intended to limit what are equivalent forms of the present invention, it is perhaps useful to consider a few modifications that are comprehended as being within the inventive teaching set forth.

For instance, while there may be advantages such as economy in air consumption and convenience in assembly in using a ported casing as shown and described, the device would function without such casing. In other words, it would be possible to simply provide otherwise suitably supported opposed jets, one at least of which was movable axially with respect to the other and the adjacent edges of which jets cooperated in the same way to define an orifice. In this manner the gauging air pressure would escape directly to the atmosphere instead of through a ported casing.

Similarly, it is unnecessary, albeit preferable, that the gauging air pressure be introduced through the movable jet or plug. It is possible to reverse the introduction of the reference and gauging air pressures as shown in Figure 1.

It is further possible to use the instant invention, or a modification thereof, as an internal diameter measuring device. In this regard it might be preferable to make both plugs movable and with a follower like plug 18.

By providing two such movable plugs only one-half the relative rotative movement between the gauge and the object whose internal diameter is being tested would be necessary as compared with a single movable plug.

These suggested structural variations from the preferred embodiment of the invention, as disclosed, are intended merely to indicate that the utilization of the instant invention may be realized in many physical forms. It has been the purpose of the above description to set forth the principle of operation and the general scope of the subject invention and which are most specifically defined in the appended claims.

What is claimed is:

1. A pneumatic measuring gauge of the type in which the escape of air through an orifice is utilized to measure the size of an object, said gauge comprising a fixed air jet, a movable air jet axially aligned proximate said fixed jet but in opposed relation thereto, the adjacent ends of said jets conjointly defining an orifice the size of which varies with the axial position of said movable jet, said movable jet having another end adapted to engage the object to be measured, means supplying a reference air pressure to one of said jets, means supplying a gauging air pressure to the other of said jets, the rate of escape of gauging air pressure through said orifice being determined by the pressure differential between said gauging and reference air pressures and the size of said orifice, and means cooperating with the gauging air pressure supply means to indicate the size of the member under test in accordance with changes in the gauging air pressure.

2. A pneumatic thickness measuring gauge which includes a fixed air jet, a movable air jet axially aligned proximate said fixed jet but in opposed relation thereto, the adjacent ends of said jets conjointly defining an orifice the size of which varies with the axial position of said movable jet, said movable jet having another end adapted to engage an object to be measured, means supplying a reference air pressure to said fixed jet, means supplying a gauging air pressure to the movable jet, the rate of escape of gauging air pressure through said orifice being determined by the pressure differential between said gauging and reference air pressures and the size of said orifice, and means cooperating with the gauging air pressure supply means to indicate the thickness of the member under test in accordance with changes in the gauging air pressure.

3. A pneumatic measuring gauge which includes a pair of axially aligned plugs, said plugs being relatively axially movable with respect to each other, the adjacent ends of said plugs conjointly defining an orifice the size of which varies in accordance with the relative axial displacement of said plugs, at least one of said plugs having an end remote from its orifice-forming end adapted to engage an object to be measured and thus determining the relative axial displacement of said plugs, means supplying a first stream of air under pressure to said orifice, means supplying a second stream of air under pressure to said orifice in opposed and contacting relation to said first stream of air, the rate of escape of said air streams through said orifice being determined by the pressure differential between said streams and the size of said orifice, and means for indicating the size of the object under test in accordance with changes in the back pressure of one of said air streams.

4. A pneumatic thickness measuring gauge which includes a fixed air jet, a movable air jet axially aligned proximate said fixed jet but in opposed relation thereto, the adjacent ends of said jets conjointly defining an orifice the size of which varies with the axial position of said movable jet, said movable jet having another end adapted to engage the object to be measured, means supplying a reference air pressure to said fixed jet, means supplying a gauging air pressure to the movable jet, the rate of escape of gauging air pressure through said orifice being determined by the pressure differential between said gauging and reference air pressure and the size of said orifice, means biasing said movable jet to a maximum orifice opening position, and means cooperating with the gauging air pressure supply means to indicate the thickness of the member under test in accordance with changes in the gauging air pressure.

5. A pneumatic measuring gauge which includes a gauging plug having an end adapted to engage an object to be measured, a reference plug axially aligned proximate the other end of said gauging plug, said gauging plug being axially movable relative to said reference plug, the adjacent ends of said plugs defining a transverse passage the volumetric capacity of which is variable in accordance with the axial position of said gauging plug, means supplying a first stream of air under pressure to said passage, means supplying a second stream of air under pressure to said passage in opposed and contacting relation to said first stream of air, the rate of escape of said air streams through said passage being determined by the pressure differential between said streams and the volumetric capacity of said passage, and means for indicating the size of the object under test in accordance with changes in the back pressure of one of said air streams.

6. A pneumatic measuring gauge of the type in which the escape of air through an orifice is utilized to measure the thickness of an object, said gauge comprising a fixed air jet, a movable air jet axially aligned proximate said fixed jet but in opposed relation thereto, said movable jet having another end adapted to engage the object to be measured, the adjacent ends of said jets having flattened portions conjointly defining an orifice the size of which varies with the axial position of said movable jet, aligned longitudinal air passages formed in said movable and said fixed jets, means supplying a reference air pressure to the air passage in said fixed jet, means supplying a gauging air pressure to the air passage in the movable jet, the rate of escape of gauging air pressure through said orifice being determined by the pressure differential between said gauging and reference air pressure and the size of said orifice, means biasing said movable jet to a maximum orifice opening position, and means cooperating with the gauging air pressure supply means to indicate the thickness of the member under test in accordance with changes in the gauging air pressure.

7. A pneumatic measuring gauge comprising an open-ended casing, a pair of axially aligned plugs disposed in said casing, said plugs being relatively movable with respect to each other, the adjacent ends of said plugs conjointly defining an orifice the size of which varies in accordance with the relative axial displacement of said plugs, at least one of said plugs having an end remote from its orifice-forming end adapted to engage an object to be measured and thus determining the relative axial displacement of said plugs, porting means in said casing communicating said orifice with the atmosphere, means supplying a first stream of air under pressure to said orifice, means supplying a second stream of air under pressure to said orifice in opposed and contacting relation to said first stream of air, the cross-sectional area of said porting means being greater than that of said orifice in all axial positions of said plugs, the rate of escape of said air streams through said orifice being determined by the pressure differential between said streams and the size of said orifice, and means for indicating the size of an object under test in accordance with changes in the back pressure of one of said air streams.

8. A pneumatic thickness measuring gauge which includes an open-ended casing, a fixed plug disposed in one end of said casing and projecting therewithin, a slidable plug disposed in the other end of said casing, said slidable plug having one end disposed exteriorly of the casing and adapted to contact the object to be measured, a first air passage formed longitudinally in said fixed plug, a second air passage formed in said slidable plug and axially aligned in opposed relation to the first air passage, the adjacent ends of said plugs coacting to define an orifice the size of which varies with the axial position of said slidable plug, porting means in said casing communicating said orifice with the atmosphere, a radial bore formed in said slidable plug and communicating with the air passage formed therein, a port formed in said casing in alignment with said bore but of greater size than said bore, means supplying a reference pressure to the air passage in said fixed plug, conduit means extending through said port and supplying a gauging pressure through the radial bore to the passage in said movable plug, the rate of escape of gauging air from said orifice to the atmosphere being determined by the pressure differential between said gauging and reference air pressures and the size of said orifice, and means in said conduit means to indicate the thickness of the member under test in accordance with changes in the gauging air pressure as said slidable plug moves axially relative to said fixed plug.

9. A pneumatic thickness measuring gauge which includes an open-ended casing, a fixed plug disposed in one end of said casing and projecting therewithin, a slidable plug disposed in the other end of said casing, said slidable plug having one end disposed exteriorly of the casing and adapted to contact the object to be measured, a first air passage formed longitudinally in said fixed plug, a second air passage formed in said slidable plug and axially aligned in opposed relation to the first air passage, the adjacent ends of said plugs coacting to define an orifice the size of which varies with the axial position of said slidable plug, porting means in said casing communicating said orifice with the atmosphere, a radial bore formed in said slidable plug and communicating with the air passage formed therein, a port formed in said casing in alignment with said bore but of greater size than said bore, means supplying a reference pressure to the air passage in said fixed plug, conduit means extending through said port and supplying a gauging pressure through the radial bore to the passage in said movable plug, the rate of escape of gauging air from said orifice to the atmosphere being determined by the pressures and the size of said orifice, means biasing the slidable plug to a maximum orifice opening position, and means in said conduit means to indicate the thickness of the member under test in accordance with back-pressure changes in the gauging air pressure supply conduit means as said slidable plug moves axially relative to said fixed plug.

10. A pneumatic thickness measuring gauge which includes an open-ended casing, a fixed plug disposed in one end of said casing and projecting therewithin, a slidable plug disposed in the other end of said casing, said slidable plug having one end disposed exteriorly of the casing and adapted to contact the object to be measured, a first air passage formed longitudinally in said fixed plug, a second air passage formed in said slidable plug and axially aligned in opposed relation to the first air passage, the adjacent ends of said plugs coacting to define an orifice the size of which varies with the axial position of said slidable plug, porting means in said casing communicating said orifice with the atmosphere, the cross-sectional area of said porting means being greater than that of said orifice in all positions of said slidable plug, a radial bore formed in said slidable plug, a port formed in said casing in alignment with said bore but of greater size than said bore, conduit means inserted through said port and adapted to communicate with the air passage formed in said slidable plug, means supplying a reference pressure to the air passage in said fixed plug, means supplying a gauging pressure through said conduit means to the passage in said movable plug, said conduit means being adapted to move with said plug relative to said casing, the rate of escape of gauging air from said orifice to the atmosphere being determined by the pressure differential betwen said gauging and reference air pressures and the size of said orifice, and means in said conduit means to indicate the thickness of the member under test in accordance with changes in the gauging air pressure.

References Cited in the file of this patent

UNITED STATES PATENTS

| | | |
|---|---|---|
| 1,985,576 | Mennesson | Dec. 25, 1934 |
| 2,392,016 | Wattebot | Jan. 1, 1946 |
| 2,397,494 | Kuppersmith | Apr. 2, 1946 |
| 2,539,624 | Huggenberger | Jan. 30, 1951 |